United States Patent Office 3,201,473
Patented Aug. 17, 1965

3,201,473
1-[BIS(2-HYDROXYPROPYL)AMINO]-2-BUTANOL
William H. Cook, South Charleston, W. Va., assignor to Union Carbide Corporation, a corporation of New York
No Drawing. Filed Apr. 11, 1962, Ser. No. 186,629
1 Claim. (Cl. 260—584)

Trialkanolamines are well-known compounds which find broad application in the chemical industry. These compounds are useful as solvents, and as intermediates in the production of other valuable products, such as surfactants and resins.

Triethanolamine and triisopropanolamine are among the most widely used and valuable of these materials. Triisopropanolamine is finding increasing value in the production of polyurethane coatings and foams. One of the disadvantages exhibited by triisopropanolamine is its poor solubility in the liquid mixtures which are employed in the production of polyurethane elastomers. For example, in the preparation of rigid polyurethane foams by the spraying technique, the optimum reaction mixtures of trichloromonofluoromethane, triisopropanolamine, and polyalkyleneoxy polyol such as the propylene oxide adduct of glycerol, cannot be employed since triisopropanolamine is only sparingly soluble in the trichloromonofluoromethane-polyol mixtures which are preferred.

Accordingly, it has been discovered that the compound 1-[bis(2-hydroxypropyl)amino] - 2-butanol was completely soluble in the fluorocarbon blowing agent-polyether polyol mixtures employed for the production of polyurethanes in which triisopropanolamine was only sparingly soluble. The use of 1-[bis(2-hydroxypropyl)-amino]-2-butanol in the production of rigid polyurethane foams instead of triisopropanolamine has the advantage of permitting the concentration of amine to be varied over a broad range as required by the particular formulation being employed. An important difference between 1-[bis(2-hydroxypropyl)amino]-2-butanol and triisopropanolamine is that 1-[bis(2-hydroxypropyl)amino]-2-butanol is liquid at room temperature while triisopropanolamine is solid.

1-[bis(2-hydroxypropyl)amino]-2-butanol is conveniently prepared in quantitative yield by the interaction of one mole of 1,2-epoxybutane with one mole of diisopropanolamine.

Besides utility in the preparation of polyurethane elastomeric materials, 1-[bis(2-hydroxypropyl)amino]-2-butanol is also useful in the manufacture of soaps in the form of a salt of a fatty acid. In contrast with triisopropanolamine, the corresponding soap prepared from 1-[bis(2-hydroxypropyl)amino]-2-butanol and the fatty acid has good solubility in mineral oil, naphtha, gasoline, and the like, and permits the use of less free fatty acid in formulating soluble oils.

Example

Diisopropanolamine (2920 grams) was charged to a five-liter reaction flask equipped with a stirrer, thermometer, condenser and dropping funnel. The flask was heated to a temperature of 80° C. and 1,2-epoxybutane (1580 grams) was fed through the dropping funnel over a period of two hours. The temperature rose from 80° C. to 146° C. during the addition. The product reaction mixture was distilled and analysis of the middle range distillate was as follows:

|  | Found | Theoretical |
|---|---|---|
| Hydroxyl number | 815 | 819 |
| Carbon_____percent__ | 57.70 | 58.5 |
| Hydrogen_____do____ | 11.23 | 11.28 |
| Nitrogen_____do____ | 7.08 | 6.81 |

Other physical properties of the novel 1-[bis(2-hydroxypropyl)amino]-2-butanol were as follows.

Specific gravity, 20/20° C. _____ 1.0073
Δsp. gravity/Δt. _____ 0.00065/° C.
Coefficient of expansion _____ 0.00065/° C.
Boiling point, ° C at 50 mm. Hg _____ 218
Refractive index:
  $n_D^{20}$ _____ 1.4673
  $n_D^{30}$ _____ 1.4639

What is claimed is:
1-[bis(2-hydroxypropyl)amino]-2-butanol.

References Cited by the Examiner
UNITED STATES PATENTS
3,092,609  6/63  Kostelitz et al. _____ 260—45.9

CHARLES B. PARKER, *Primary Examiner.*